(12) United States Patent
Lee

(10) Patent No.: US 10,784,517 B2
(45) Date of Patent: Sep. 22, 2020

(54) DEVICE AND METHOD FOR MANUFACTURING MEMBRANE-ELECTRODE ASSEMBLY FOR FUEL CELL

(71) Applicants: Hyundai Motor Company, Seoul (KR); Kia Motors Corporation, Seoul (KR)

(72) Inventor: Jin Won Lee, Boryeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 223 days.

(21) Appl. No.: 15/697,942

(22) Filed: Sep. 7, 2017

(65) Prior Publication Data
US 2018/0337410 A1 Nov. 22, 2018

(30) Foreign Application Priority Data
May 18, 2017 (KR) .......................... 10-2017-0061332

(51) Int. Cl.
*H01M 8/1004* (2016.01)
*H01M 4/88* (2006.01)

(52) U.S. Cl.
CPC ....... *H01M 4/8896* (2013.01); *H01M 4/8814* (2013.01); *H01M 8/1004* (2013.01)

(58) Field of Classification Search
CPC .... H01M 4/8896; H01M 8/1004; H01B 13/00
See application file for complete search history.

(56) References Cited

U.S. PATENT DOCUMENTS

| 2010/0051181 A1* | 3/2010 | Mori | H01M 4/8814 |
| | | | 156/184 |
| 2017/0033384 A1* | 2/2017 | Cho | B32B 37/025 |

FOREIGN PATENT DOCUMENTS

| JP | 2010-176897 A | 8/2010 |
| KR | 10-2009-0043765 A | 5/2009 |
| KR | 10-2016-0123458 A | 10/2016 |

* cited by examiner

*Primary Examiner* — James Lee
(74) *Attorney, Agent, or Firm* — Morgan, Lewis & Bockius LLP

(57) ABSTRACT

A device for manufacturing a membrane-electrode assembly for a fuel cell may include top and bottom side bonding rolls respectively disposed above and below a transfer path through which an electrolyte membrane and top and bottom electrode films transferred with a predetermined line speed, one of the top side and bottom side bonding rolls provided reciprocally movable in a vertical direction through a first driving source, and transfer anode and cathode catalyst electrode layers of the top and bottom electrode films to top and bottom sides of the electrolyte membrane while compressing the top and bottom electrode films; film rewinders provided above and below the transfer path to rewind the top and bottom electrode films; and a compulsive driving roll provided in a rewinding path of an electrode film rewound by one of the film rewinders and selectively compulsively feeding the electrode film with a predetermined driving speed.

16 Claims, 5 Drawing Sheets

DEVICE AND METHOD FOR MANUFACTURING MEMBRANE-ELECTRODE ASSEMBLY FOR FUEL CELL

CROSS-REFERENCE TO RELATED APPLICATION

The present application claims priority to Korean Patent Application No. 10-2017-0061332 filed on May 18, 2017, the entire contents of which is incorporated herein for all purposes by this reference.

BACKGROUND OF THE INVENTION

Field of the Invention

The present invention relates to a system for manufacturing a fuel cell stack part. More particularly, the present invention relates to a device for manufacturing a membrane-electrode assembly for a fuel cell, and a manufacturing method thereof.

Description of Related Art

As well-known, a fuel cell generates electricity from electrochemical reaction between hydrogen and oxygen. The fuel cell is characterized in that it can continue to generate electricity using external chemical reaction materials without a separate charging process.

The fuel cell may include separation plates with a membrane-electrode assembly (MEA) interposed therebetween. A plurality of fuel cells may be consecutively disposed to form a fuel cell stack.

Here, the membrane-electrode assembly, which is a core portion of the fuel cell, is for example has a 3-layer structure in which an anode catalyst electrode layer and a cathode catalyst electrode layer are formed, interposing an electrolyte membrane through which hydrogen ions move therebetween. The anode catalyst electrode layer is formed in one side of the electrolyte membrane and the cathode catalyst electrode layer is formed in the other side of the electrolyte membrane. Such a membrane-electrode assembly having the 3-layer structure may be manufactured by using, for example, a direct coating method, a decal method, and the like.

The decal method manufacture the membrane-electrode assembly having the 3-layer structure by stacking electrode films coated with catalyst electrode layers respectively on opposite sides of an electrolyte membrane, bonding the catalyst electrode layers by transferring the same to the opposite sides of the electrolyte membrane using a roll-laminating method, and removing the electrode films.

That is, the membrane-electrode manufacturing process using the decal method can manufacture the 3-layer structured membrane-electrode assembly by thermally compressing roll-type electrode films where the catalyst electrode layers are coated and a roll-type electrolyte membrane by passing the catalyst electrode layers and the electrolyte membrane through a high temperature and high pressure bonding rolls and then removing the electrode films.

The membrane-electrode manufacturing process using the decal method that uses the roll laminating method can manufacture the 3-layer structured membrane-electrode assembly with fast speed, and accordingly, it has an advantage in mass production.

However, the decal method that uses continuous roll lamination has a problem of arranging locations for thermal compression of the anode catalyst electrode layer and the cathode catalyst electrode layer because the catalyst electrode layers and the electrolyte membrane are thermally compressed in a direction that they are in contact with each other by being passed through the high temperature and high pressure bonding rolls while placing the electrode films where the catalyst electrode layers are respectively coated at opposite sides of the electrolyte membrane that is interposed between the electrode films.

That is, since the catalyst electrode layers are thermally compressed to the opposite sides of the electrolyte membrane while the catalyst electrode layers and the electrolyte membrane continuously pass between the high temperature and high pressure bonding rolls, which are always in a pressurized state, the locations for the terminal compression of the catalyst electrode layers may do not accurately match due to feeding speed of the electrode films in the continuously roll laminating process.

Further, another reason that it is difficult to arrange locations for thermal compression of the anode and cathode catalyst electrode layers is that a pitch between the catalyst electrode layers is not consistent in a process for manufacturing catalyst electrode layers having consecutive patterns by coating a catalyst slurry to the electrode films.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a device for manufacturing a membrane-electrode assembly for a fuel cell, which can automatically arrange locations for transferring of anode and cathode catalyst electrode layers with respect to opposite sides of an electrolyte membrane, and a method thereof.

A device for manufacturing a membrane-electrode assembly for a fuel cell according to an exemplary embodiment of the present invention bonds an anode catalyst electrode layer and a cathode catalyst electrode layer that are consecutively formed in top and bottom electrode films to top and bottom sides of an electrolyte membrane using a roll-to-roll method, and the device may include i) a top side bonding roll and a bottom side bonding roll that are respectively disposed above and below a transfer path through which an electrolyte membrane and top and bottom electrode films that are transferred with a predetermined line speed, one of the top side and bottom side bonding rolls provided reciprocally movable in a vertical direction through a first driving source, and transfer anode and cathode catalyst electrode layers of the top and bottom electrode films to top and bottom sides of the electrolyte membrane while compressing the top and bottom electrode films; ii) film rewinders that are provided above and below the transfer path at a rear side of the top side and bottom side bonding rolls and rewind the top and bottom electrode films; and iii) a compulsive driving roll that is provided in a rewinding path of an electrode film rewound by one of the film rewinders and selectively compulsively feed the electrode film with a predetermined driving speed.

The device for manufacturing a membrane-electrode assembly for fuel cell may include: a top side location detector and a bottom side location detector that are provided above and below the transfer path at a front side of the top and bottom bonding rolls, detect locations of the anode catalyst electrode layer and the cathode catalyst electrode layer of the top and bottom electrode films, and outputs detect signals to a control device.

The device for manufacturing a membrane-electrode assembly for fuel cell may include: delamination blades that are provided above and below the transfer path at the side of the film rewinders and separate the top electrode film and the bottom electrode film.

In the device for manufacturing a membrane-electrode assembly for fuel cell, the bottom side bonding roll among the top and bottom side bonding rolls may be provided reciprocally movable in a vertical direction through the first driving source.

In the device for manufacturing a membrane-electrode assembly for fuel cell, the compulsive driving roll may be provided in a rewinding path of the bottom electrode film rewound by a bottom side film rewinder with reference to the transfer path.

In the device for manufacturing a membrane-electrode assembly for fuel cell, the compulsive driving roll may include: a driven roller that rotates while contacting the bottom electrode film that moves along the rewinding path of the bottom electrode film; and a driving roller that is provided reciprocally movable in a direction that becomes away from or close to the driven roller through a second driving source and rotatable with a predetermined driving speed through a third driving source.

The device for manufacturing a membrane-electrode assembly for fuel cell may include: an electrolyte membrane unwinder that supplies the electrolyte membrane wound in a roll form by winding the electrolyte membrane at a start end portion of the transfer path; film unwanders that supplies the roll-shaped top and bottom electrode films where the anode and cathode catalyst electrode layers are coated at regular intervals between the electrolyte unwinder and the top side and bottom side bonding rolls by unwinding the top and bottom electrode films to top and bottom sides of the electrolyte membrane in the transfer path; and an electrode membrane rewinder that winds a fabric of the membrane-electrode assembly where the anode catalyst electrode layer and the cathode catalyst electrode layer are respectively bonded to the top and bottom sides of the electrolyte membrane at end portion of the transfer path.

According to an exemplary embodiment of the present invention, a device for manufacturing a membrane-electrode assembly for a fuel cell is provided. The device manufacturing a membrane-electrode assembly for the fuel cell may include i) an electrolyte membrane unwinder that supplies an electrolyte membrane wound in a roll shape by unwinding the electrolyte membrane to a predetermined transfer path; ii) film unwinders that are respectively provided above and below the transfer path at a rear side of the electrolyte membrane unwinder and supplying roll-shaped top and bottom electrode films where anode and cathode catalyst electrode layers are coated at regular intervals by unwinding the top electrode films to top and bottom sides of the electrolyte membrane; iii) a top side bonding roll and a bottom side bonding roll that are respectively provided above and below the transfer path of the electrolyte membrane and the top and bottom electrode film that are transferred with a predetermined line speed, reciprocally movable in a vertical direction under the transfer path through a first driving source, and transferring the anode and cathode catalyst electrode layers of the top and bottom electrode films by compressing the anode and cathode catalyst electrode layers to top and bottom sides of the electrolyte membrane; iv) a top side location detector and a bottom side location detector that are provided above and below the transfer path at a front side of the top side and bottom side bonding rolls, detect locations of the anode and cathode catalyst electrode layers of the top and bottom electrode films, and output detect signals to a control unit; v) delamination blades that are respectively provided above below the transfer path at a rear side of the top side and bottom side bonding rolls and separate the electrolyte membrane and the top and bottom side electrode films; vi) film rewinders that are respectively provided above and below the transfer path at the delamination blades and rewind the top and bottom electrode films; vii) a compulsive driving roll that is provided in a rewinding path of the bottom electrode rewound by the film rewinder that is disposed below the transfer path and selectively compulsively feeds the bottom electrode film with a predetermined driving speed; and viii) an electrolyte membrane rewinder that rewinds a fabric of a membrane-electrode assembly where the anode catalyst electrode layer and the cathode catalyst electrode layer are bonded to top and bottom sides of the electrolyte membrane at an end of the transfer path.

In addition, in the device for manufacturing a membrane-electrode assembly for the fuel cell, the compulsive driving roll may include: a driven roller that rotates while contacting the bottom electrode film that move along the rewinding path of the bottom electrode film; and a driving roller that is provided reciprocally movable in a direction that becomes away from or close to the driven roller through a second driving source and rotatable with a predetermined driving speed through a third driving source.

In addition, in the device for manufacturing a membrane-electrode assembly for the fuel cell, the top side and bottom side location sensors may vision photograph anode and cathode catalyst electrode layers of the top and bottom electrode films, respectively and output vision data to the control device.

Further, the control device may determine whether the anode catalyst electrode layer of the top electrode film is disposed further forward than the cathode catalyst electrode layer of the bottom electrode film.

Further, the control device may determine whether the cathode catalyst electrode layer of the bottom electrode film is disposed further forward than the anode catalyst electrode layer of the top portion electrode film based on the vision data of the top side and bottom side location sensors.

Further, in the device for manufacturing a membrane-electrode assembly for the fuel cell, the control device may apply a driving signal to the first driving source, the second driving source, and the third driving source according to the vision data of the top side and bottom side location sensors.

According to an exemplary embodiment of the present invention, a method for manufacturing a membrane-electrode assembly for a fuel cell using the device for manufacturing the membrane-electrode assembly for the fuel cell is provided. The method may include (a) supplying a roll-shaped electrolyte membrane by unwinding the electrolyte membrane to a predetermined transfer path; (b) supplying roll-shaped top and bottom electrode films where anode and cathode catalyst electrode layers are consecutively coated at regular intervals by unwinding the top and bottom electrode films to top and bottom sides of the electrolyte membrane; (c) transferring the anode and cathode catalyst electrode layers of the top and bottom electrode films to top and bottom sides of the electrolyte membrane while passing the electrolyte membrane and the top and bottom electrode films through the top side and bottom side bonding rolls; (d) rewinding the electrode films where the anode and cathode catalyst electrode layers are transferred through top side and bottom side film rewinders; (e) detecting locations of the anode and cathode catalyst electrode layers with respect to the top and bottom electrode films through top side and bottom side location sensors and outputting detect signals; and (f) driving the bottom side bonding roll and the compulsive driving roll through the control unit according to the detect signals of the top side and the bottom side location sensors and arranging the locations of the anode and cathode catalyst electrode layers of the top and bottom electrode films.

In the method for manufacturing a membrane-electrode assembly for the fuel cell, in (f), the bottom side bonding roll may be moved to a downward direction by applying a control signal to a first driving source through the control device.

In the method for manufacturing a membrane-electrode assembly for the fuel cell, in (f), a driving roller of the compulsive driving roll may be moved to a driven roller by applying a control signal to a second driving source.

In the method for manufacturing a membrane-electrode assembly for the fuel cell, in (f), the driving roller may be driven with a predetermined driving speed by applying a control signal to a third driving source.

In the method for manufacturing a membrane-electrode assembly for the fuel cell, in (f), the bottom electrode film wound around a bottom side film rewinder may be compulsively fed with a predetermined driving speed through the compulsive driving roll.

In the method for manufacturing a membrane-electrode assembly for the fuel cell, in (f), locations of the anode and cathode catalyst electrode layers of the top and bottom electrode films may be disposed.

In the method for manufacturing a membrane-electrode assembly for the fuel cell, in (f), the electrolyte membrane and the top and bottom electrode films may be separated from each other through delamination blades at a rear side of the top side and bottom side bonding rolls.

In the method for manufacturing a membrane-electrode assembly for the fuel cell, in (e), the control device may determine whether the anode catalyst electrode layer of the top electrode film is disposed further forward than the cathode catalyst electrode layer of the bottom electrode film according to the detect signal of the top side and bottom side location sensors.

In the method for manufacturing a membrane-electrode assembly for the fuel cell, the control device may set the driving speed of the compulsive driving roll to be faster than predetermined line speed of the electrolyte membrane and the top and bottom electrode films when it is determined that the anode catalyst electrode layer of the top electrode film is disposed further forward than the cathode catalyst electrode layer of the bottom electrode film.

Further, in the method for manufacturing a membrane-electrode assembly for the fuel cell, in (e), the control device may determine whether the cathode catalyst electrode layer of the bottom electrode film is disposed further forward than the anode catalyst electrode layer of the top electrode film according to the detect signal of the top side and bottom side location sensors.

Further, in the method for manufacturing a membrane-electrode assembly for the fuel cell, the control device may set the driving speed of the compulsive driving roll to be slower than the predetermined line speed predetermined line speed of the electrolyte membrane and the top and bottom electrode films when it is determined that the cathode catalyst electrode layer of the bottom electrode film is disposed further forward than the anode catalyst electrode layer of the top electrode film.

Further, in the method for manufacturing a membrane-electrode assembly for the fuel cell, in (e), the top side and bottom side location sensors may vision photograph the anode and cathode catalyst electrode layers with respect to the top and bottom electrode films and output vision data to the control device.

According to the exemplary embodiments of the present invention, the membrane-electrode assembly can be manufactured while automatically arranging transferring locations of the anode and cathode catalyst electrode layers of the top and bottom electrode films through compulsive feeding of the bottom electrode film using the compulsive driving roll.

Accordingly, a location deviation of the anode and cathode catalyst electrode layers due to a transferring speed difference between the top and bottom electrode films and coating location dispersion of the catalyst electrode layers can be compensated so that transferring uniformity of the anode and cathode catalyst electrode layers can be improved, quality of the membrane-electrode assembly can be improved, and productivity of the membrane-electrode assembly can be more improved Further, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
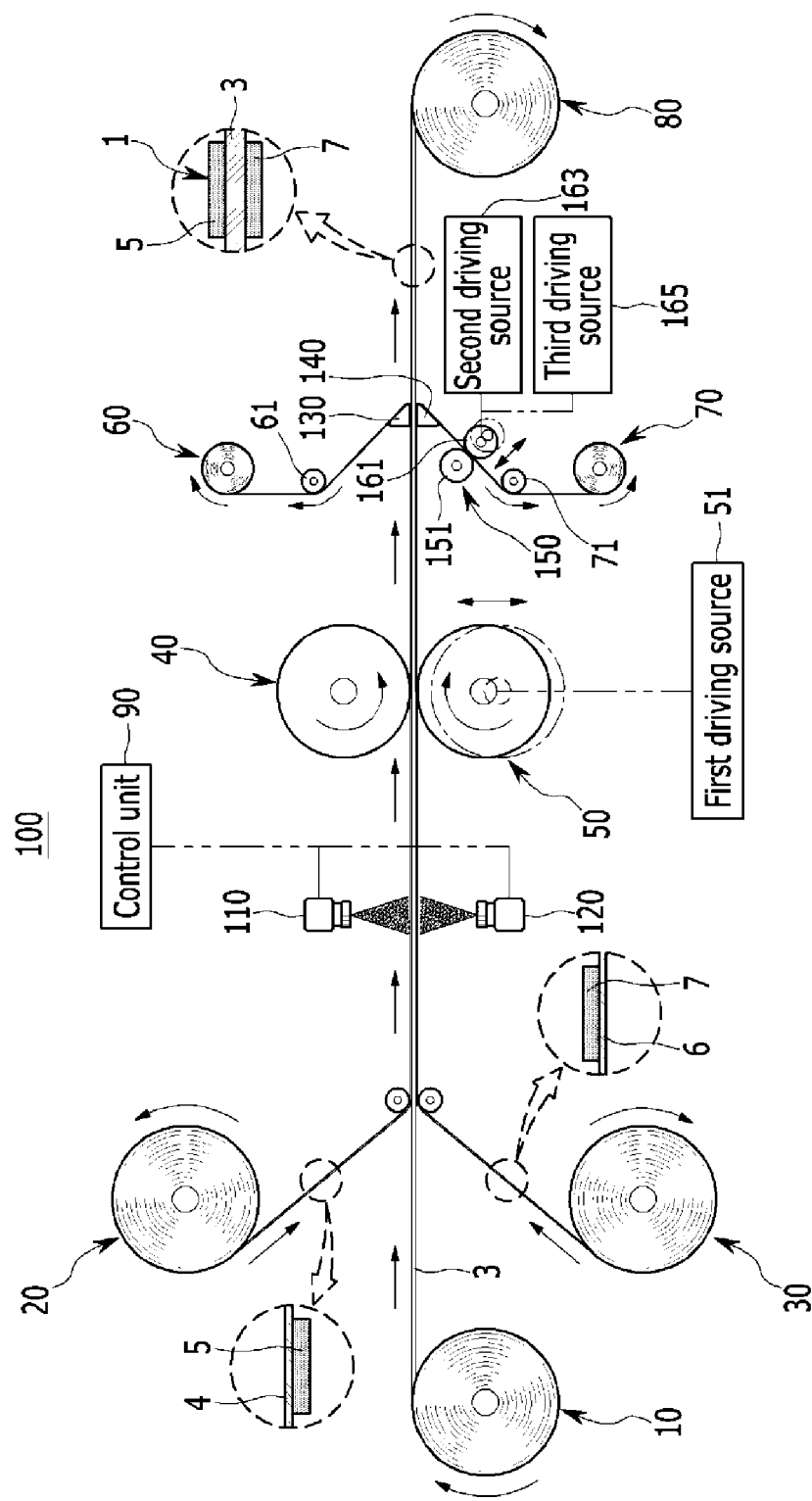
FIG. 1 schematically shows a device for manufacturing a membrane-electrode assembly for a fuel cell according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in portion by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present application will be described more fully hereinafter with reference to the accompanying drawings, in which example embodiments of the invention are shown. As those skilled in the art would realize, the described embodiments may be modified in various different ways, all without departing from the spirit or scope of the present invention.

Parts that are irrelevant to the description are omitted to clearly illustrate the present invention, and like reference numbers designate like constituent elements through the specification.

Further, the size and thickness of each configuration shown in the drawings are arbitrarily illustrated for better understanding and ease of description, the present invention is not limited to shown drawings, and the thicknesses are exaggerated for clarity of a plurality of parts and regions.

In a following detailed description, the terms "first" and "second" will be used to discriminate one component from another component, but the components may not be limited to the above terms.

In addition, unless explicitly described to the contrary, the word "comprise" and variations such as "comprises" or "comprising", will be understood to imply the inclusion of stated elements but not the exclusion of any other elements.

In the following description, "~ unit", "~ means", "~ part", and "~ member" mean a device of a general configuration to perform at least one function or operation.

FIG. 1 schematically shows a device for manufacturing a membrane-electrode assembly for a fuel cell according to an exemplary embodiment of the present invention.

Referring to FIG. 1, a device 100 for manufacturing a membrane-electrode assembly for a fuel cell according to an exemplary embodiment of the present invention may be applied to an automation system that automatically continuously manufactures parts of unit fuel cells that form a fuel cell stack.

For example, the device 100 according to the exemplary embodiment of the present invention is provided for manufacturing a membrane-electrode assembly 1, which is a core portion of the fuel cell, where an anode catalyst electrode layer 5 and a cathode catalyst electrode layer 7 are bonded to opposite sides of an electrolyte membrane 3 (The membrane-electrode assembly 1 is also called an electrode membrane in the art).

Further, referring to the drawing, the device 100 for manufacturing the membrane-electrode assembly for the fuel cell may manufacture the membrane-electrode assembly 1 by bonding the anode catalyst electrode layer 5 to a top side of the electrolyte membrane 3 and bonding the cathode catalyst electrode layer 7 to a bottom side of the electrolyte membrane 3.

The device 100 for manufacturing the membrane-electrode assembly for the fuel cell according to the exemplary embodiment of the present invention can automatically continuously manufacture the membrane-electrode assembly 1 using a roll-to-roll method.

The roll-to-roll method implies a method that a part fabric in roll form is unwound, the unwound fabric is transferred through a plurality of transfer rolls along a predetermined path, and a predetermined portion element is continuously formed in each of the part fabric.

The to-roll type device 100 unwinds a fabric of the electrolyte membrane 3 in roll form, unwinds fabrics of top and bottom electrode films 4 and 6 in roll form toward a top side and a bottom side respectively, bonds the anode and cathode catalyst electrode layers 5 and 7 respectively coated to the fabrics of the top and bottom electrode films 4 and 6 to the top side and the bottom side of the electrolyte membrane 3 such that a fabric of the membrane-electrode assembly 1 can be fabricated.

For example, the device 100 can manufacture a three-layered membrane-electrode assembly 1 by layering the top and bottom electrode films 4 and 6 where the anode catalyst electrode layer 5 and the cathode catalyst electrode layer 7 are continuously coated to the top and bottom sides of the electrolyte membrane 3 and bonding the respective catalyst electrode layers 5 and 7 to the top and bottom sides of the electrolyte membrane 3 by use of a roll laminating and decal method.

Further, the device 100 includes a process for winding the above-manufactured membrane-electrode assembly 1 into a roll form. In addition, although it is not illustrated in the exemplary embodiment of the present invention, a membrane-electrode assembly part, i.e., a final fuel cell part, can be manufactured by unwinding the fabric of membrane-electrode assembly 1 in the roll form and cutting the fabric of the membrane-electrode assembly 1 into unit formats, each including the anode and cathode catalyst electrode layers 5 and 7.

The device 100 for manufacturing the above-described membrane-electrode assembly for fuel cell according to the exemplary embodiment of the present invention has a structure in which the anode catalyst electrode layer 5 and the cathode catalyst electrode layer 7 of the top electrode film 4 and the bottom electrode film 6 can be continuously transferred to the top and bottom sides of the electrolyte membrane 3 by using the roll laminating and decal method.

For this, the device 100 for manufacturing the above-described membrane-electrode assembly for fuel cell according to the exemplary embodiment of the present invention basically includes an electrolyte membrane unwinder 10, film unwinders 20 and 30, top and bottom bonding rolls 40 and 50, film rewinders 60 and 70, and an electrolyte membrane rewinder 80.

The above-stated constituent elements and other constituent elements to be described later may be provided in a main frame in roll-to-roll feeding equipment. The main frame supports the respective constituent elements by standing vertically, and may be formed of one frame or a frame divided into two or more frames.

The main frame may include various accessory components including a bracket, a bar, a rod, a plate, a housing, a case, a block, and the like to support the constituent elements of the device 100.

Since the above-described various accessory elements are for installation of the components of the device 100 to be described below on the main frame, the accessory elements are collectively referred to as a main frame except for exceptional cases in the exemplary embodiment of the present invention.

The electrolyte membrane unwinder 10 is provided in a start end portion of a predetermined transfer path to supply a fabric of the electrolyte membrane 3 in roll form to the predetermined transfer path by unwinding the rolled fabric.

The film unwinders 20 and 30 are provided above and below the transfer path at a rear side of the electrolyte membrane unwinder 10. The film unwinders 20 and 30 supply the roll-shaped top and bottom electrode films 4 and 6 where the anode catalyst electrode layer 5 and the cathode catalyst electrode layer 7 are coated at regular intervals by unwinding the top and bottom electrode films 4 and 5 to the upside and down side of the electrode membrane 3 in the transfer path.

Here, one of the film unwanders 20 and 30 is provided above the transfer path and the supplies the roll-shaped top electrode film 4 where the anode catalyst electrode layer 5 is coated at regular intervals by unwinding the top electrode film 4 to the top side the electrolyte membrane 3, and will now be called a top side film unwinder 20. In addition, the other one 30 is provided below the transfer path and supplies the roll-shaped bottom electrode film 6 where the cathode catalyst electrode layer 7 is coated at regular intervals by unwinding the bottom electrode film 6 to the bottom side of the electrolyte membrane 3, and will now be called a bottom side film unwinder 30.

In the instant case, the anode catalyst electrode layer 5 of the top electrode film 4 faces the top side of the electrolyte membrane 3 in the transfer path, and the cathode catalyst electrode layer 7 of the bottom electrode film 6 faces the bottom side of the electrolyte membrane 3 in the transfer path.

The top and bottom bonding rolls 40 and 50 let the electrolyte membrane 3 and the top and bottom electrode films 4 and 6 transferring through the transfer path pass through, and compress the same with high pressure at a predetermined temperature, and transfer the anode and cathode catalyst electrode layers 5 and 7 of the top and bottom electrode films 4 and 6 to the top side and the bottom side of the electrolyte membrane 3, respectively using the roll laminating and decal method.

The top and bottom bonding rolls 40 and 50 are respectively disposed above and below the transfer paths of the electrolyte membrane 3 and the top and bottom electrode films 4 and 6 that are transferred with predetermined line speed. One of the top and bottom bonding rolls 40 and 50, provided as a bonding roller, rotates by a driver (not shown in the drawing) including a motor and the like and is closely attached to the other such that the top and the bottom bonding rolls 40 and 50 compress the top and bottom electrode films 4 and 6 that are disposed in the top side and the bottom side of the electrolyte membrane, interposing the electrolyte membrane 3 while rotating in a direction that is opposite to the rotation direction of the other.

Here, one of the top and bottom bonding rolls 40 and 50 is provided in the top side of the transfer path, and will be referred to as a top side bonding roll 40. In addition, the other is provided in the bottom side of the transfer path, and will be referred to as a bottom side bonding toll 50.

In the instant case, the top side bonding roll 40 is provided as a driven bonding roller. The bottom side bonding roll 50, provided as a driving bonding roller, rotates by the driver while interposing the electrolyte membrane 3 and the top and bottom side electrode films 4 and 6 between with the top side bonding roll 40 and is closely attached to the top side bonding roll 40 and transfers the electrolyte membrane 3 and the top and bottom side electrode films 4 and 6 with the predetermined line speed while rotating in a direction that is opposite to the rotation direction of the top side bonding roll 40.

The film rewinders 60 and 70 rewind the top and bottom electrode films 4 and 6 of which the anode catalyst electrode layer 5 and the cathode catalyst electrode layer 7 are transferred to the top side and the bottom side of the electrolyte membrane 3 while passing through the top and bottom side bonding rolls 40 and 50 together with the electrolyte membrane 3. The film rewinders 60 and 70 are respectively disposed in the top side and the bottom side of the transfer path at a rear side of the top and bottom side bonding rolls 40 and 50.

Here, one of the film rewinders 60 and 70 is provided in the top side of the transfer path and forms a rewinding path of the top electrode film 4, and will be referred to as a top side film rewinder 60. The other one of the film rewinders 60 and 70 is provided in the bottom side of the transfer path and forms a rewinding path of the bottom electrode film 6, and will be referred to as a bottom side film rewinder 70.

The top side film rewinder 60 and the bottom side film rewinder 70 rotate by a driver including a motor, and respectively rewind the top electrode film 4 and the bottom electrode film 6.

In the instant case, the top side film rewinder 60 and the bottom side film rewinder 70 rewind the top electrode film 4 and the bottom electrode film 6 with the predetermined rewinding speed by receiving a driving force from the driver, and the rewinding speed may be determined by tensions of the top electrode film 4 and the bottom electrode film 6.

Thus, tension detection devices 61 and 71 are respectively provided in the rewinding paths of the top electrode film 4 and the bottom electrode film 6 that are rewound by the top side film rewinder 60 and the bottom side film rewinder 70 to detect the tensions of the top electrode film 4 and the bottom electrode film 6.

The tension detection devices 61 and 71 are provided as a roller type, and detect tensions of the top electrode film 4 and the bottom electrode film 6 in the film rewinding paths and outputs the detected tension values to a control device 90.

The controller 90 controls a driving force of the driver according to detection signals of the tension detection devices 61 and 71, and controls rewinding speed of the top and bottom side film rewinders 60 and 70.

For example, when the tension of the top electrode film 4 and/or the bottom electrode film 6 is greater than a predetermined reference value, the control device 90 blocks power applied to the driver and maintains the top side film rewinder 60 and/or the bottom side film rewinder 70 in a free roll state.

In addition, when the tension of the top electrode film 4 and/or the bottom electrode film 6 is lower than the predetermined reference value, the control unit 90 applies predetermined power to the driver such that the top side film rewinder 60 and/or the bottom side rewinder 70 rotate with predetermined driving speed.

The electrolyte membrane rewinder 80 rewinds the fabric of the membrane-electrode assembly 1 in which the anode and cathode catalyst electrode layers and 7 are respectively boned to the top and bottom sides of the electrolyte membrane 3 while the electrolyte membrane 3 and the top and bottom electrode films 4 and 6 pass through the top and bottom sides bonding rolls 40 and 50.

Such an electrolyte membrane rewinder 80 is provided at an end portion of the transfer path. The electrolyte membrane rewinder 80 may rewind the fabric of the membrane-electrode assembly 1 while rotating by a driver including a motor.

Meanwhile, the electrolyte membrane 3 unwound from the electrolyte membrane unwinder 10 and the top and bottom electrode films 4 and 6 unwound from the top and bottom sides film unwanders 20 and 30 are transferred with a predetermined line speed along the transfer path.

The line speed may be determined by a driving force of the driver, applied to the top and bottom sides bonding rolls 40 and 50, the top and bottom sides film rewinders 60 and 70, and the electrolyte membrane rewinder 80.

Meanwhile, it may be difficult to accurately match transfer locations of the anode catalyst electrode layer 5 and the cathode catalyst electrode layer 7 on the top and bottom sides of the electrolyte membrane 3 due to a feeding speed difference of the top electrode film 4 and the bottom electrode film 6 transferred along the transfer path and a pitch between the anode catalyst electrode layer 5 and the cathode catalyst electrode layer 7 coated to the top electrode film 4 and the bottom electrode film 6 in the device 100 for manufacturing the membrane-electrode assembly for fuel cell according to the exemplary embodiment of the present invention.

Thus, a device 100 for manufacturing a membrane-electrode assembly that can automatically arrange transfer locations of anode and cathode catalyst electrode layers 5 and 7 with respect to top and bottom sides of the electrolyte membrane 3 can be provided according to an exemplary embodiment of the present invention.

For this, in the device 100 for manufacturing the membrane-electrode assembly for fuel cell according to the exemplary embodiment of the present invention, a bottom side bonding roll 50 is provided to be reciprocally movable in a vertical direction thereof. In addition, the device 100 includes top and bottom location sensors 110 and 120, delamination blades 130 and 140, and a compulsive driving roll 150.

First, the bottom side bonding roll 50 rotates by the driver as described above, and is reciprocally movable in a vertical direction by a first driving source 51 according to the present exemplary embodiment.

That is, the bottom side bonding roll 50 may move upward through the first driving source 51 to compress an electrolyte membrane 3 and top and bottom electrode films 4 and 5 that are disposed between the bottom side bonding roll 50 and a top side bonding roll 40. In addition, the bottom side bonding roll 50 may move downward by the first driving source 51 to release the compression applied to the electrolyte membrane 3 and the top and bottom electrode films 4 and 6.

Here, the first driving source 51 may include a known operating cylinder or servo linear motor that is connected to the bottom side bonding roll 50 to provide forward and rearward driving force in a vertical direction to the bottom side bonding roll 50.

In the exemplary embodiment of the present invention, the top and bottom location sensors 110 and 120 are respectively provided above and below a transfer path at a front side of the top side and bottom side bonding rolls 40 and 50. The top and bottom location sensors 110 and 120 detect locations of anode and cathode catalyst electrode layers 5 and 7 of top and bottom electrode films 4 and 6 and outputs detect signals to a control device 90.

Here, one of the top and bottom location sensors 110 and 120 is provided above the transfer path and detects a location of the anode catalyst electrode layer 5 of the top electrode film 4 that is transferred along the transfer path together with the electrolyte membrane 3, and this will be referred to as a top side location detector 110. In addition, the other one 120 is provided below the transfer path and detects a location of the cathode catalyst electrode layer 7 of the bottom electrode film 6 that is transferred along the transfer path together with the electrolyte membrane 3, and this will be referred to as a bottom side location detector 120.

The top side location detector 110 and the bottom side location detector 120 may include vision sensors that vision photograph the anode and cathode catalyst electrode layers 5 and 7 of the top and bottom electrode films 4 and 6 and output vision to the control device 90. The top side location detector 110 and the bottom side location detector 120 are provided as vision sensors that are well-known to the art, and therefore no further description will be provided.

Alternatively, the top side and bottom side location sensors 110 and 120 may include known location sensors that irradiate ultrasonic waves, laser beams, or infrared rays to the top and bottom electrode films 4 and 6 to detect locations of the anode and cathode catalyst electrode layers 5 and 7.

In the exemplary embodiment of the present invention, the delamination blades 130 and 140 are delamination blades, and respectively provided above and below the transfer path at a rear side of the top side and bottom side bonding rolls 40 and 50.

The delamination blades 130 and 140 separate the electrolyte membrane 3 where the anode catalyst electrode layer 5 and the cathode catalyst electrode layer 7 of the top and bottom electrode films 4 and 5 are bonded to the top and bottom sides thereof by compression of the top side and the bottom side bonding rolls 40 and 50 and the top and bottom electrode films 4 and 60 from which the anode and cathode catalyst electrode layers 5 and 7 are transferred.

In addition, the delamination blades 130 and 140 separate the electrolyte membrane 3 and the top and bottom electrode films 4 and 6 where the anode and cathode catalyst electrode layers 5 and 7 are coated from each other in a state that the compression of the top side and the bottom side bonding rolls 40 and 50 is released.

One of the delamination blades 130 and 140 is provided above the transfer path and separates the electrolyte membrane 4 and the top electrode film 4 from each other, and this will be referred to as a top side blade 130. The other one 140 is provided below the transfer path and separates the electrolyte membrane 3 and the bottom electrode film 6, and this will be referred to as a bottom side blade 140.

In the exemplary embodiment of the present invention, the compulsive driving roll 150 arranges locations of the anode and cathode catalyst electrode layers 5 and 7 of the top and bottom electrode layers 5 and 7 when the locations of the anode and cathode catalyst electrodes 5 and 7 of the top and bottom electrode films 4 and 6, detected by the top and bottom location sensors 110 and 120 do not match.

In the above-stated case, the compulsive driving roll 150 may compulsively feed the top electrode film 4 or the bottom electrode film 6 in the rewinding path of the top electrode film 4 of the bottom electrode film 6 by one of the top side and bottom side film rewinders 60 and 70.

Here, the film compulsive feeding of the compulsive driving roll 150 moves the bottom side bonding roll 50 in a downward direction through the first driving source 1, and is performed in a state that the compression applied to the electrolyte membrane 3 and the top and bottom electrode films 4 and 6 by the top side bonding roll 40 and the bottom side bonding roll 50 is released.

The compulsive driving roll 150 is provided in the rewinding path of the bottom electrode film 6 rewound by the bottom side film rewinder 70 with reference to the transfer path in the exemplary embodiment of the present invention.

The compulsive driving roll 150 selectively compulsively feeds the bottom electrode film 6 with a predetermined driving speed in the rewinding path of the bottom electrode film 6, and may arrange locations of the anode catalyst electrode layer 5 and the cathode catalyst electrode later 7 of the top and bottom electrode films 4 and 6.

The compulsive driving roll 150 includes a driven roller 151 and a driving roller 161. The driven roller 151 is provided to be rotatable while contacting the bottom electrode film 6 that is transferred along the rewinding path of the bottom electrode film 6 by the bottom film rewinder 70.

The driving roller 161 is provided to be reciprocally movable in a direction that becomes away from or close to the driven roller 151, and is rotatable with a predetermined driving speed.

The driving roller 161 may be provided to be reciprocally movable in a direction that becomes away from or close to the driven roller 151 by the second driving source 163. In addition, the driving roller 161 may be rotatable with a predetermined driving speed by the third driving source 165.

The driving roller 161 moves in a direction that becomes away from the driven roller 151 by the second driving source 163. In the instant case, the driving roller 161 does not receive a driving force from the third driving source 165, and the driven roller 151 freely rotates while contacting the bottom electrode film 6 that moves with the predetermined line speed.

In the instant case, the driving roller 161 moves in a direction that becomes close to the driven roller 151 by the second driving source 163. In the instant case, the driving roller 161 rotates with a predetermined driving speed by receiving a driving force from the third driving source 165, and compulsively feeds the bottom electrode film 6 while contacting the driven roller 151 and rotating in a direction that is opposite to the rotation direction of the driven roller 151.

Here, the second driving source 163 may be provided as a known operating cylinder or servo linear motor that is connected to the driving roller 161 and provides a forward and rearward driving force in a direction of the driven roller 151 to the driving roller 161. In addition, the third driving source 165 may include a known servo motor that is connected to the driving roller 161 and provides a rotation force to the driving roller 161.

As described in the exemplary embodiment of the present invention, the compulsive driving roll 150 is provided in the rewinding path of the bottom electrode film 6 rewound by the bottom side film rewinder 70 because the bottom electrode 6 is sagged in a gravity direction due to its weight such that the bottom side of the electrolyte 3 and the cathode catalyst electrode 7 are separated from each other, easing compulsive feeding of the bottom electrode film 6.

When the compulsive driving roll 150 is provided in the rewinding path of the top electrode film 4 that is rewound by the top side film rewinder 60, the top electrode film 4 is sagged in the gravity direction due to its weight such that the top side of the electrolyte membrane 3 and the anode catalyst electrode layer 5 are stuck to each other, and accordingly, the compulsive feeding of the top electrode film 4 may not be smoothly conducted.

The control device 90 controls overall operation of the device 100, and may control overall operation of the device 100 by various programs and control logics.

Further, in the exemplary embodiment of the present invention, the control device 90 applies driving control signals to the first driving source 51, the second driving source 163, and the third driving source 165 based on detect signals received from the top side and bottom side location sensors 110 and 120, that is, vision data of the anode and cathode catalyst electrode layers 5 and 7 of the top and bottom electrode films 4 and 6.

The control device 90 analyzes the vision data received from the top side and the bottom side location sensors 110 and 120 to determine whether the anode catalyst electrode layer 5 of the top electrode film 4 is disposed further forward than the cathode catalyst electrode layer 7 of the bottom electrode film 6.

In addition, the control device 90 analyzes the vision data received from the top side and bottom side location sensors 110 and 120 to determine whether the cathode catalyst electrode layer 7 of the bottom electrode film 6 is disposed further forward than the anode catalyst electrode layer 5 of the top electrode film 4.

Here, when it is determined that the anode catalyst electrode layer 5 of the top electrode film 4 is disposed further forward than the cathode catalyst electrode layer 7 of the bottom electrode film 6, the control device 90 applies the driving control signal to the first driving source 51 to move the bottom side bonding roll 50 to a downward direction through the first driving source 51. In addition, the control device 90 applies the driving control signal to the second driving source 163 to move the driving roller 161 close to the driven roller 151 through the second driving source 163. Further, the control device 90 applies the driving control signal to the third driving source 165 to rotate the driving roller 161 with a predetermined driving speed through the third driving source 165. In the instant case, the control device 90 sets a driving speed of the driving roller 161 to be faster than the predetermined line speed of the electrolyte membrane 3 and the top and bottom electrode films 4 and 6.

When it is determined that the cathode catalyst electrode layer 7 of the bottom electrode film 6 is disposed further forward than the anode catalyst electrode layer 5 of the top electrode film 4, the control device 9 applies the driving control signal to the first driving source 51 to move the bottom side bonding roll 50 to a downward direction through the first driving source 51. In addition, the control device 90 applies the driving control signal to the second driving source 163 to move the driving roller 161 close to the driven roller 151 through the second driving source 163. Further, the control device 90 applies the driving control signal to the third driving source 165 to rotate the driving roller 161 with a predetermined driving speed through the third driving source 165. In the instant case, the control device 90 sets the driving speed of the driving roller 161 slower than the predetermined line speed of the electrolyte membrane 3 and the top and bottom electrode films 4 and 6.

Hereinafter, an operation of the device 100 for manufacturing the membrane-electrode assembly for fuel cell, and a method for manufacturing a membrane-electrode assembly for fuel cell using the device 100 will be described in detailed with reference to FIG. 1 and the accompanying drawings.

Figure 2:
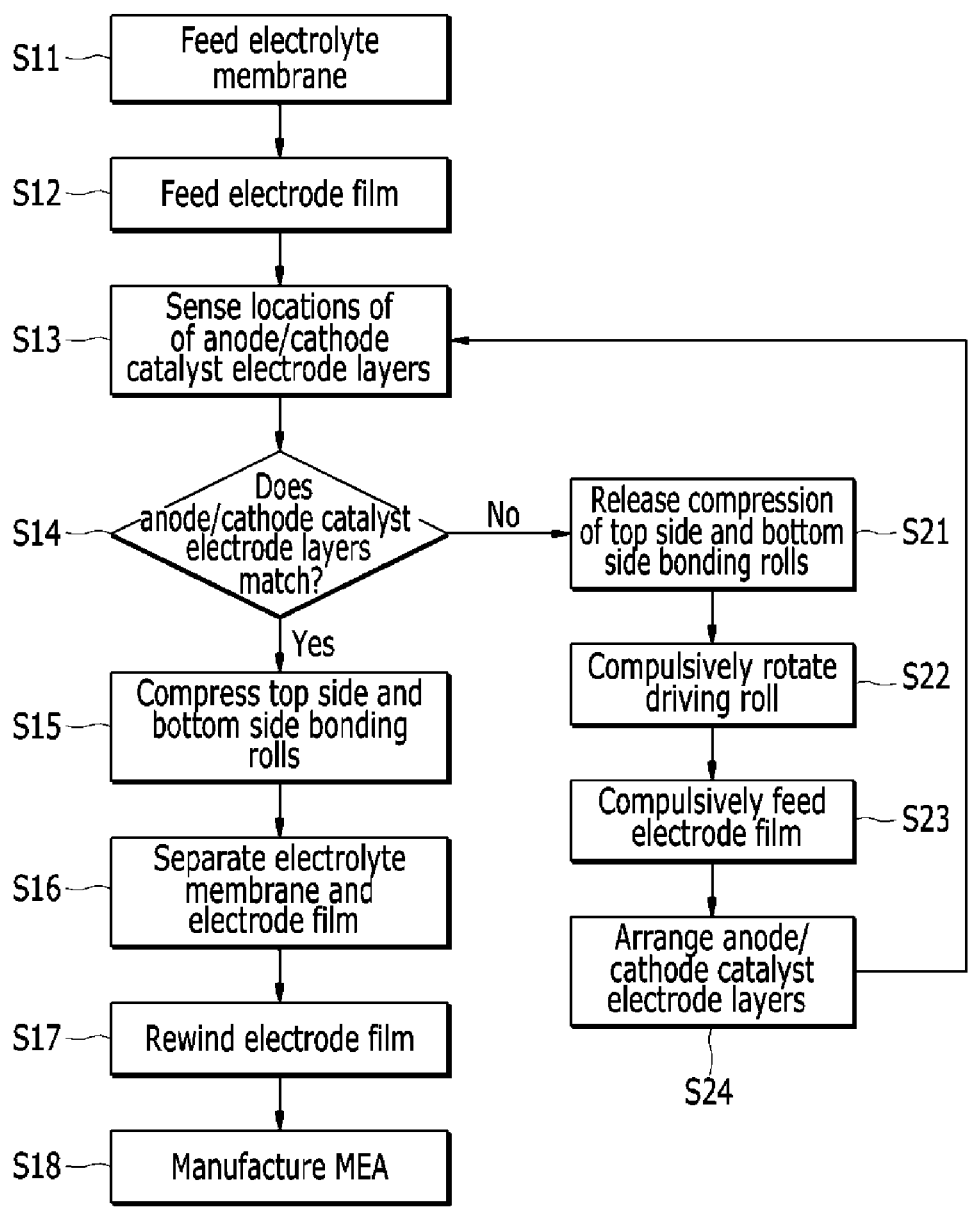
FIG. 2 is a flowchart provided for description of a method for manufacturing the membrane-electrode assembly for the fuel cell according to the exemplary embodiment of the present invention.
Figure 3:
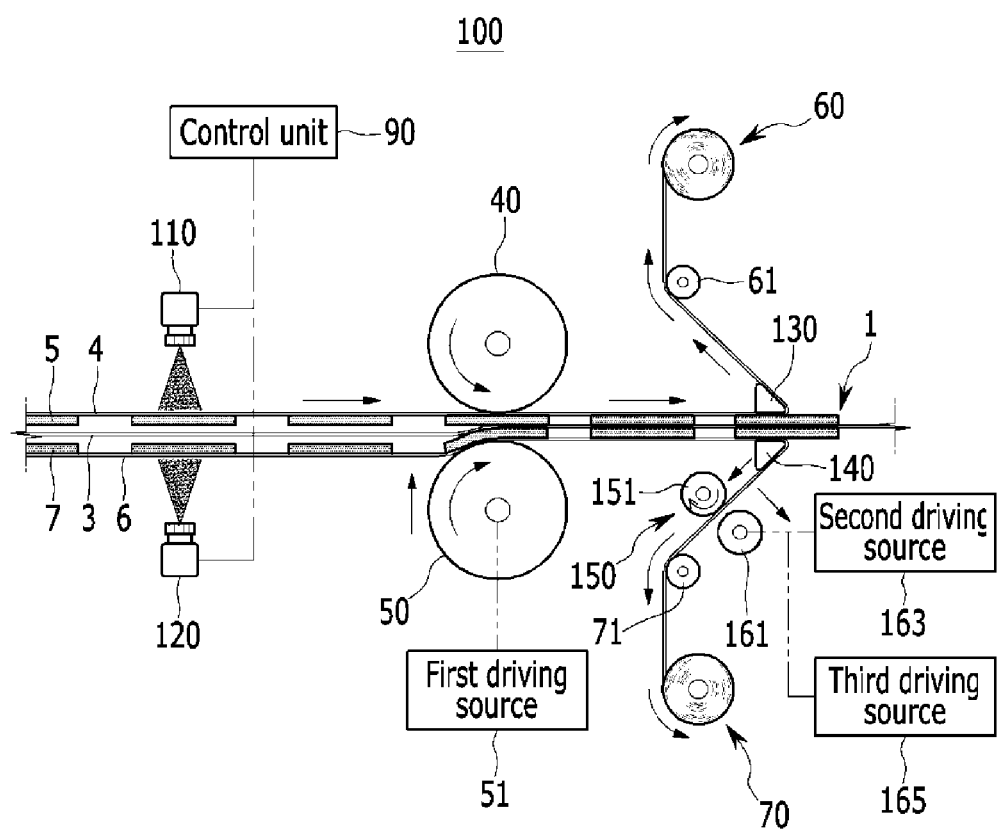
FIG. 3, FIG. 4 and to FIG. 5 are provided for description of an operation of the device for manufacturing the membrane-electrode assembly for the fuel cell and the method for manufacturing a membrane-electrode assembly for a fuel cell using the device.
Figure 4:
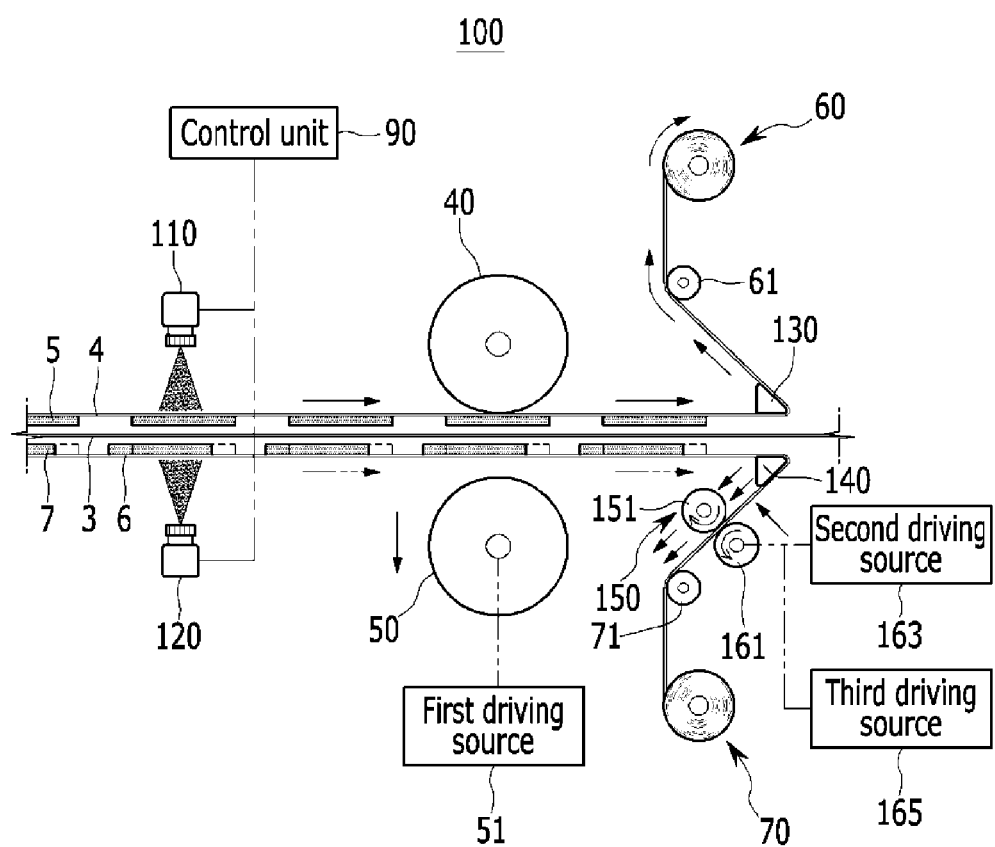
Figure 5:
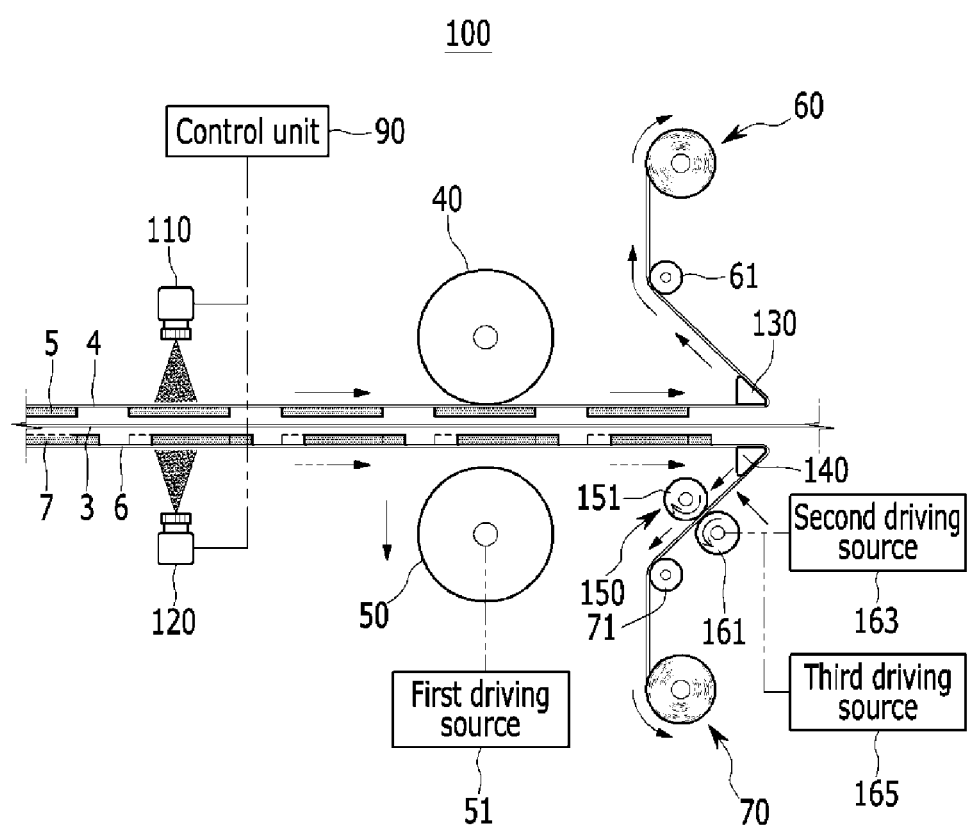

FIG. 2 is a flowchart provided for description of a manufacturing method of an membrane-electrode assembly for fuel cell according to an exemplary embodiment of the present invention, and FIG. 3, FIG. 4 and to FIG. 5 are provided for description of operation of a device for manufacturing a membrane-electrode assembly for fuel cell and a method for manufacturing a membrane-electrode assembly for fuel cell using the device according to an exemplary embodiment of the present invention.

Referring to FIG. 1 and FIG. 2, in the exemplary embodiment of the present invention, a fabric of an electrolyte membrane 3 in a roll form is unwound through an electrolyte membrane unwinder 10 to feed the same to a predetermined transfer path (S11).

In addition, in the exemplary embodiment of the present invention, top and bottom electrode films 4 and 5 in roll form are unwound to the transfer path through a top side film unwinder 20 and a bottom side film unwinder 30 to feed the top and bottom electrode films 4 and 6 to top and bottom sides of the electrolyte membrane 3 (S12).

Here, anode catalyst electrode layers 5 and cathode catalyst electrode layers 7 are continuously coated with regular intervals in the top and bottom electrode films 4 and 6 corresponding to the top and bottom sides of the electrolyte membrane 3.

In such a process, in the exemplary embodiment of the present invention, the anode catalyst electrode layer 5 and the cathode catalyst electrode layer 7 of the top and bottom electrode films 4 and 6 are respectively vision photographed through top side and bottom side location sensors 110 and 120 and vision data is output to a control device 90 (S13).

As such, the control device 90 analyzes the vision data received from the top side and bottom side location sensors 110 and 120 to determine whether locations of the anode catalyst electrode layer 5 and the cathode catalyst electrode layer 7 of the top and bottom electrode films 4 and 5 match within a predetermined location range (S14).

When it is determined in S14 that the locations of the anode catalyst electrode layer 5 and the cathode catalyst electrode layer 7 of the top and bottom electrode films 4 and 5 do match within the predetermined location range, the control device 90 determines whether the anode catalyst electrode layer 5 of the top electrode film 4 is disposed further forward than the cathode catalyst electrode layer 7 of the bottom electrode film 6.

In addition, when it is determined in S14 that the locations of the anode catalyst electrode layer 5 and the cathode catalyst electrode layer 7 of the top and bottom electrode films 4 and 5 do match within the predetermined location range, the control device 90 determines whether the cathode catalyst electrode layer 7 of the bottom electrode film 6 is disposed further forward than the anode catalyst electrode layer 5 of the top portion electrode film 4.

The control device 90 may determine in S14 that that the anode catalyst electrode layer 5 of the top electrode film 4 is not disposed further forward than the cathode catalyst electrode layer 7 of the bottom electrode film 6 and the cathode catalyst electrode layer 7 of the bottom electrode film 6 is not disposed further forward than the anode catalyst electrode layer 5 of the top electrode film 4. That is, the control device 90 may determine that the locations of the anode and cathode catalyst electrode layers 5 and 7 match within the predetermined location range.

As shown in FIG. 3, the locations of the anode and cathode catalyst electrode layers 5 an d7 of the top and bottom electrode films 4 and 6 match within the predetermined location range, the control device 90 applies a driving control signal to a first driving source 51 to move the bottom side bonding roll 50 an upward direction through the first driving source 51.

As such, the bottom side bonding roll 50 is closely attached to the top side bonding roll 40 and transferred along the transfer path with a predetermined line speed while compressing the electrolyte membrane 3 and the top and bottom electrode films 4 and 6 by rotating in a direction that is opposite to the rotation direction of the top side bonding roll 40.

In addition, in the above-stated case, the control device 90 applies a driving control signal to the second driving source 163 to move a driving roller 161 of a compulsive driving roll 150 in a direction that becomes away from a driven roller through the second driving source 163. In such a case, the control device 90 stops driving of a third driving source 165 by applying a driving control signal to the third driving source 165.

In such a state, the electrolyte 3 and the top and bottom electrode films 4 and 6 entering between the top side bonding roll 40 and the bottom side bonding roll 50 are compressed and then transferred along the transfer path with the predetermined line speed according to the present exemplary embodiment.

As such, the top side bonding roll 40 and the bottom side bonding roll 50 compress the electrolyte membrane 3 and the top and bottom electrode films 4 and 6 such that the anode catalyst electrode layer 5 and the cathode catalyst electrode layer 7 of the electrode films 4 and 6 are transferred to top and bottom sides of the electrolyte membrane 3 by a roll laminating and decal method, and accordingly, the anode and cathode catalyst electrode layers 5 and 7 are respectively bonded to the top and bottom sides of the electrolyte membrane 3 (S15).

Next, the electrolyte membrane 3 where the anode and cathode catalyst electrode layers 5 and 7 are bonded to the top and bottom side thereof due to the compression of the top side and bottom side bonding rolls 40 and 50 and the top and bottom electrode films 4 and 5 from which the anode and cathode catalyst electrode layers 5 and 7 are transferred are separated from each other through top side and bottom side delamination blades 130 and 140 (S16).

Next, the top and bottom electrode films 4 and 6 separated with the electrolyte membrane 3 by the top side and bottom side delamination blades 130 and 140 are rewound through top side and bottom side film rewinders 60 and 70 (S17).

Here, since the driving roller 161 of the compulsive driving roll 150 is moved in a direction that becomes away from the driven roller 151 by the second driving source 163, the driven roller 151 freely rotates while contacting the bottom electrode film 6.

Thus, in the exemplary embodiment of the present invention, a fabric of the electrode-membrane 1 of which the anode and cathode catalyst electrode layers 5 and 7 are respectively bonded to the top and bottom sides of the electrolyte membrane 3 can be manufactured through the above-described series of steps (S18). In addition, the fabric of the membrane-electrode assembly 1 is transferred to a subsequent process while being wound in a roll form around an electrode-membrane rewinder 80.

Meanwhile, through the above-described series of steps, the control unit 90 analyzes the vision data received from the top side and bottom side location sensors 110 and 120 in S14 to determine whether or not locations of the anode and cathode catalyst electrode layers 5 and 7 of the top and bottom electrode films 4 and 6 match within the predetermined location range.

For example, as shown in FIG. 4, the control device 90 may determine whether the anode catalyst electrode layer 5 of the top electrode film 4, transferred along the transfer path with the predetermined line speed is disposed further forward than the cathode catalyst electrode layer 7 of the bottom electrode film 6.

When it is determined than the anode catalyst electrode layer 5 of the top electrode film 4, transferred along the transfer path with the predetermined line speed is disposed further forward than the cathode catalyst electrode layer 7 of the bottom electrode film 6, the control device 90 applies a driving control signal to the first driving source 51 to move the bottom side bonding roll 50 in a downward direction through the first driving source 51. Accordingly, the compression applied to the electrolyte membrane 3 and the top and bottom films 4 and 5 that are disposed between the top side bonding roll 40 and the bottom side bonding roll 50 is released (S21).

In the instant case, the electrolyte membrane 3 and the top and bottom electrode films 4 and 6 are transferred along the transfer path with the predetermined line speed by the electrode membrane rewinder 80 and top side and bottom side film rewinders 60 and 70, and then separated from each other by the top side and bottom side delamination blades 130 and 140.

Here, the top side film rewinder 60 and the bottom side film rewinder 70 rewind the top electrode film 4 and the bottom electrode film 6 with the predetermined line speed along rewinding paths of the top and bottom electrode films 4 and 6.

During such a process, the control device 90 applies a driving control signal to the second driving source 163 to move the driving roller 161 of the compulsive driving roll 150 toward the driven roller 151 through the second driving source 163. Simultaneously, the control device 90 applies a driving control signal to the third driving source 165 to rotate the driving roller 161 with a predetermined driving speed through the third driving source 165 (S22).

As such, the driving roller 161 is closely attached to the driven roller 151, while interposing the bottom electrode film 6 therebetween in the rewinding path of the bottom electrode film 6, and compulsively feeds the bottom electrode film 6 while rotating in a direction that is opposite to the rotation direction of the driven roller 151 (S23).

Here, as described above, since the anode catalyst electrode layer 5 of the top electrode film 4 is disposed further forward than the cathode catalyst electrode layer 7 of the bottom electrode film 6, the control device 90 sets the driving speed of the driving roller 161 faster than the line speed of the electrolyte membrane 3 and the top and bottom side electrode films 4 and 6. Thus, in the exemplary embodiment of the present invention, the bottom electrode film 6 can be compulsively fed by the compulsive driving roll 150 with speed that is faster than the predetermined line speed in the rewinding path.

That is, in the exemplary embodiment of the present invention, when the anode catalyst electrode layer 5 of the top electrode film 4 transferred along the transfer path is disposed further forward than the cathode catalyst electrode layer 7 of the bottom electrode film 6, the bottom electrode film 6 is compulsively fed along the rewinding path with a driving speed that is faster than the predetermined line speed.

Accordingly, locations of the anode catalyst electrode layer 5 and the cathode catalyst electrode layer 7 of the top and bottom electrode films 4 and 5 may match within the predetermined location range in the exemplary embodiment of the present invention (S24).

Next, as in S13 and S14, when it is determined that the locations of anode catalyst electrode layer 5 and the cathode catalyst electrode layer 7 of the top and bottom electrode films 4 and 5 match within the predetermined location range by the control device 90 according to detect signals of the top side and bottom side location sensors 110 and 120, the steps S15 to S18 are conducted.

On the other hand, as in S13 and S14, when it is determined that the locations of anode catalyst electrode layer 5 and the cathode catalyst electrode layer 7 of the top and bottom electrode films 4 and 5 do not match within the predetermined location range by the control device 90 according to detect signals of the top side and bottom side location sensors 110 and 120, the steps S21 to S24 are conducted.

Meanwhile, through the above-described series steps S11 to S18, the control device 90 analyzes the vision data received from the top side and bottom side location sensors 110 and 120 to determine that the locations of the anode and cathode catalyst electrode layers 5 and 7 of the top and bottom electrode films 4 and 6 do not match within the predetermined location range in S14.

For example, as shown in FIG. 5, the control device 90 may determine whether the cathode catalyst electrode layer 7 of the bottom film layer 6 is disposed further forward than the anode catalyst electrode layer 5 of the top electrode film 6 transferred along the transfer path with a predetermined line speed.

When it is determined that the cathode catalyst electrode layer 7 of the bottom film layer 6 is disposed further forward than the anode catalyst electrode layer 5 of the top electrode film 6, the control device 90 applies a driving control signal to the first driving source 51 to move the bottom side bonding roll in a downward direction through the first driving source 51. Accordingly, the compression applied to the electrolyte membrane 3 and the top and bottom electrode films 4 and 5 disposed between the top side bonding roll 40 and the bottom side bonding rolls 50 is released (S21).

In the instant case, the electrolyte membrane 3 and the top and bottom electrode films 4 and 6 are transferred along the transfer path with the predetermined line speed by the electrode membrane rewinder 80 and top side and bottom side film rewinders 60 and 70, and then separated from each other by the top side and bottom side delamination blades 130 and 140.

Here, the top side and bottom side rewinders 60 and 70 rewind the top electrode film 4 and the bottom electrode film 6 with the predetermined line speed along the rewinding paths of the top and bottom electrode films 4 and 6.

During such a process, the control device 90 applies a driving control signal to the second driving source 163 to move the driving roller 161 of the compulsive driving roll 150 toward the driven roller 151 through the second driving source 163. Simultaneously, the control device 90 applies a driving control signal to the third driving source 165 to rotate the driving roller 161 with a predetermined driving speed through the third driving source 165 (S22).

As such, the driving roller 161 is closely attached to the driven roller 151, while interposing the bottom electrode film 6 therebetween in the rewinding path of the bottom electrode film 6, and compulsively feeds the bottom electrode film 6 while rotating in a direction that is opposite to the rotation direction of the driven roller 151 (S23).

Here, as described above, since the cathode catalyst electrode layer 7 of the bottom film layer 6 is disposed further forward than the anode catalyst electrode layer 5 of the top electrode film 6, the control device 90 sets the driving speed of the driving roller 161 to be slower than the line speed of the electrolyte membrane 3 and top and the bottom side electrode films 4 and 6. Accordingly, the bottom electrode film 6 can be compulsively fed with a driving speed that is slower than the predetermined line speed in the rewinding path in the exemplary embodiment.

That is, in the exemplary embodiment of the present invention, when the cathode catalyst electrode layer 7 of the bottom film layer 6 is disposed further forward than the anode catalyst electrode layer 5 of the top electrode film 6, the bottom electrode film 6 is compulsively fed along the rewinding path with a driving speed that is slower than the predetermined line speed.

Accordingly, in the exemplary embodiment of the present invention, the anode and cathode catalyst electrode layers 5 and 7 of the top and bottom electrode films 4 and 6 may be disposed to be matched within the predetermined location range (S24).

Next, as in the steps S13 and S14, when it is determined that the locations of the anode and cathode catalyst electrode layers 5 and 7 match each other within the predetermined location range by the control device 90 according to detect signals of the top side and bottom side location sensors 110 and 120, the steps S15 to S18 are performed.

On the other hand, as in the steps S13 and S14, when it is determined that the locations of the anode and cathode catalyst electrode layers 5 and 7 do not match each other within the predetermined location range by the control device 90 according to detect signals of the top side and bottom side location sensors 110 and 120, the steps S21 to S24 are performed.

According to the exemplary embodiment of the present invention, the device 100 for manufacturing the membrane-electrode assembly for fuel cell and the method for manufacturing the membrane-electrode assembly for fuel cell can manufacture the membrane-electrode assembly 1 while automatically arranging transferring locations of the top and bottom electrode films 4 and 6 and the anode and cathode catalyst electrode layers 5 and 7 by compulsive feeding of the bottom electrode film 6 through the compulsive driving roll 150.

Thus, a location deviation of the anode and cathode catalyst electrode layers 5 and 7 due to a transferring speed difference between the top and bottom electrode films 4 and 5 and coating location dispersion of the catalyst electrode layers 5 and 7 can be compensated.

Accordingly, transferring uniformity of the anode and cathode catalyst electrode layers 5 and 7 can be improved, quality of the membrane-electrode assembly 1 can be improved, and productivity of the membrane-electrode assembly 1 can be more improved.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for manufacturing a membrane-electrode assembly for a fuel cell, bonding an anode catalyst electrode layer and a cathode catalyst electrode layer that are consecutively formed in top and bottom electrode films to top and bottom sides of an electrolyte membrane using a roll-to-roll method, the device comprising:
    a top side bonding roll and a bottom side bonding roll that are respectively disposed above and below a transfer path through which an electrolyte membrane and top and bottom electrode films are transferred with a predetermined line speed, one of the top side and bottom side bonding rolls provided reciprocally movable in a vertical direction thereof through a first driving source, and transfer anode and cathode catalyst electrode layers of the top and bottom electrode films to the top and bottom sides of the electrolyte membrane while compressing the top and bottom electrode films;
    film rewinders that are provided above and below the transfer path at a rear side of the top side and bottom side bonding rolls and rewind the top and bottom electrode films; and
    a compulsive driving roll that is provided in a rewinding path of an electrode film rewound by one of the film rewinders and selectively compulsively feed the bottom electrode film with a predetermined driving speed,
    wherein the bottom side bonding roll among the top and bottom side bonding rolls is provided reciprocally movable in a vertical direction thereof through the first driving source,
    wherein the compulsive driving roll is provided in a rewinding path of the bottom electrode film rewound by the one of the film rewinders with respect to the transfer path, and
    wherein the compulsive driving roll includes:
        a driven roller that rotates while contacting the bottom electrode film that moves along the rewinding path of the bottom electrode film; and
        a driving roller that is provided reciprocally movable in a direction that becomes away from or adjacent to the driven roller through a second driving source and rotatable with a predetermined driving speed through a third driving source.

2. The device for manufacturing the membrane-electrode assembly for the fuel cell of claim 1, including a top side location detector and a bottom side location detector that are provided above and below the transfer path at a front side of the top and bottom bonding rolls, detect locations of the anode catalyst electrode layer and the cathode catalyst electrode layer of the top and bottom electrode films, and output detection signals to a controller.

3. The device for manufacturing the membrane-electrode assembly for the fuel cell of claim 2, including delamination blades that are provided above and below the transfer path at a side of the film rewinders and separate the top electrode film and the bottom electrode film.

4. The device for manufacturing the membrane-electrode assembly for the fuel cell of claim 1, including:
    an electrolyte membrane unwinder that supplies the electrolyte membrane wound in a roll form by winding the electrolyte membrane at a start end of the transfer path;
    film unwinders that supply the roll-shaped top and bottom electrode films where the anode and cathode catalyst electrode layers are coated at predetermined intervals between the electrolyte membrane unwinder and the top side and bottom side bonding rolls by unwinding the top and bottom electrode films to the top and bottom sides of the electrolyte membrane in the transfer path; and an electrode membrane rewinder that winds a fabric of the membrane-electrode assembly where the anode catalyst electrode layer and the cathode catalyst electrode layer are respectively bonded to the top and bottom sides of the electrolyte membrane at end of the transfer path.

5. A device for manufacturing a membrane-electrode assembly for a fuel cell, the device comprising:

an electrolyte membrane unwinder that supplies an electrolyte membrane wound in a roll shape by unwinding the electrolyte membrane to a predetermined transfer path;

film unwinders that are respectively provided above and below the transfer path at a rear side of the electrolyte membrane unwinder and supplying roll-shaped top and bottom electrode films where anode and cathode catalyst electrode layers are coated at predetermined intervals by unwinding the top and bottom electrode films to top and bottom sides of the electrolyte membrane;

a top side bonding roll and a bottom side bonding roll that are respectively provided above and below the transfer path of the electrolyte membrane and the top and bottom electrode films that are transferred with a predetermined line speed, reciprocally movable in a vertical direction thereof under the transfer path through a first driving source, and transferring the anode and cathode catalyst electrode layers of the top and bottom electrode films by compressing the anode and cathode catalyst electrode layers to the top and bottom sides of the electrolyte membrane;

a top side location detector and a bottom side location detector that are provided above and below the transfer path at a front side of the top side and bottom side bonding rolls, detect locations of the anode and cathode catalyst electrode layers of the top and bottom electrode films, and output detection signals to a controller;

delamination blades that are respectively provided above and below the transfer path at a rear side of the top side and bottom side bonding rolls and separate the electrolyte membrane and the top and bottom side electrode films;

film rewinders that are respectively provided above and below the transfer path at the delamination blades and rewind the top and bottom electrode films;

a compulsive driving roll that is provided in a rewinding path of the bottom electrode film rewound by one of the film rewinders that is disposed below the transfer path and selectively compulsively feeds the bottom electrode film with a predetermined driving speed; and an electrolyte membrane rewinder that rewinds a fabric of the membrane-electrode assembly where the anode catalyst electrode layer and the cathode catalyst electrode layer are bonded to top and bottom sides of the electrolyte membrane at an end of the transfer path, wherein the compulsive driving roll includes:
  a driven roller that rotates while contacting the bottom electrode film that moves along the rewinding path of the bottom electrode film; and
  a driving roller that is provided reciprocally movable in a direction that becomes away from or adjacent to the driven roller through a second driving source and rotatable with a predetermined driving speed through a third driving source.

6. The device for manufacturing the membrane-electrode assembly for the fuel cell of claim 5,
wherein the top side and bottom side location detectors vision photograph anode and cathode catalyst electrode layers of the top and bottom electrode films, respectively, and output vision data to the controller, and
wherein the controller is configured to determine whether the anode catalyst electrode layer of the top electrode film is disposed further forward than the cathode catalyst electrode layer of the bottom electrode film and is configured to determine whether the cathode catalyst electrode layer of the bottom electrode film is disposed further forward than the anode catalyst electrode layer of the top electrode film based on the vision data of the top side and bottom side location detectors, and
wherein the controller controls at least one of the first driving source, the second driving source and the third driving source based on the vision data.

7. The device for manufacturing the membrane-electrode assembly for the fuel cell of claim 6, wherein the controller applies a driving signal to the first driving source to control the top side bonding roll and the bottom side bonding roll, the second driving source, and the third driving source to control the driving roller, according to the vision data of the top side and bottom side location detectors.

8. A method for manufacturing the membrane-electrode assembly for the fuel cell using the device for manufacturing the membrane-electrode assembly for the fuel cell of claim 5, comprising:
  (a) supplying a roll-shaped electrolyte membrane by unwinding the electrolyte membrane to a predetermined transfer path;
  (b) supplying roll-shaped top and bottom electrode films where anode and cathode catalyst electrode layers are consecutively coated at predetermined intervals by unwinding the top and bottom electrode films to top and bottom sides of the electrolyte membrane;
  (c) transferring the anode and cathode catalyst electrode layers of the top and bottom electrode films to top and bottom sides of the electrolyte membrane while passing the electrolyte membrane and the top and bottom electrode films through the top side and bottom side bonding rolls;
  (d) rewinding the electrode films where the anode and cathode catalyst electrode layers are transferred through top side and bottom side film rewinders;
  (e) detecting locations of the anode and cathode catalyst electrode layers with respect to the top and bottom electrode films through top side and bottom side location detectors and outputting detection signals; and
  (f) driving the bottom side bonding roll and the compulsive driving roll through the controller according to the detection signals of the top side and the bottom side location detectors and arranging the locations of the anode and cathode catalyst electrode layers of the top and bottom electrode films.

9. The method for manufacturing the membrane-electrode assembly for the fuel cell of claim 8, wherein, in (f), the bottom side bonding roll is moved to a downward direction thereof by applying a control signal to the first driving source through the controller, a driving roller of the compulsive driving roll is moved to a driven roller by applying a control signal to the second driving source, and the driving roller is driven with a predetermined driving speed by applying a control signal to the third driving source.

10. The method for manufacturing the membrane-electrode assembly for the fuel cell of claim 9, wherein, in (f), the bottom electrode film wound around a bottom side film rewinder is compulsively fed with a predetermined driving speed through the compulsive driving roll, and locations of the anode and cathode catalyst electrode layers of the top and bottom electrode films are disposed.

11. The method for manufacturing the membrane-electrode assembly for the fuel cell of claim 9, wherein, in (f), the electrolyte membrane and the top and bottom electrode films are separated from each other through delamination blades at a rear side of the top side and bottom side bonding rolls.

12. The method for manufacturing the membrane-electrode assembly for the fuel cell of claim 10, wherein, in (e), the controller is configured to determine whether the anode catalyst electrode layer of the top electrode film is disposed further forward than the cathode catalyst electrode layer of the bottom electrode film according to the detection signal of the top side and bottom side location detectors.

13. The method for manufacturing the membrane-electrode assembly for the fuel cell of claim 12, wherein the controller sets the driving speed of the compulsive driving roll to be faster than a predetermined line speed of the electrolyte membrane and the top and bottom electrode films when it is determined that the anode catalyst electrode layer of the top electrode film is disposed further forward than the cathode catalyst electrode layer of the bottom electrode film.

14. The method for manufacturing the membrane-electrode assembly for the fuel cell of claim 10, wherein, in (e), the controller is configured to determine whether the cathode catalyst electrode layer of the bottom electrode film is disposed further forward than the anode catalyst electrode layer of the top electrode film according to the detection signal of the top side and bottom side location detectors.

15. The method for manufacturing the membrane-electrode assembly for the fuel cell of claim 14, wherein the controller sets the driving speed of the compulsive driving roll to be slower than the predetermined line speed predetermined line speed of the electrolyte membrane and the top and bottom electrode films when it is determined that the cathode catalyst electrode layer of the bottom electrode film is disposed further forward than the anode catalyst electrode layer of the top electrode film.

16. The method for manufacturing the membrane-electrode assembly for the fuel cell of claim 8, wherein, in (e), the top side and bottom side location detectors vision photograph the anode and cathode catalyst electrode layers with respect to the top and bottom electrode films and output vision data to the controller.

* * * * *